United States Patent [19]

Katayama et al.

[11] Patent Number: 5,414,619
[45] Date of Patent: May 9, 1995

[54] METHOD AND DEVICE FOR CONTROLLING OBJECT TO BE CONTROLLED USING LEARNING FUNCTION

[75] Inventors: Yasunori Katayama, Mito; Yasuo Morooka, Hitachi; Takashi Okada, Hitachi; Masaaki Nakajima, Hitachi; Satoshi Hattori, Iwaki; Masakane Shigyo, Hitachi, all of Japan

[73] Assignee: Hitachi, Ltd., Tokyo, Japan

[21] Appl. No.: 5,400

[22] Filed: Jan. 15, 1993

[30] Foreign Application Priority Data

Jan. 20, 1992 [JP] Japan .................................. 4-007630

[51] Int. Cl.⁶ ...................... G06F 15/46; G06F 15/18; G05B 13/04
[52] U.S. Cl. .................................. 364/151; 364/157; 364/472; 395/23; 395/903
[58] Field of Search .................. 364/148, 149–151, 364/164, 165, 176, 177, 157, 472; 395/21, 22, 23, 903, 904, 906

[56] References Cited

U.S. PATENT DOCUMENTS

| | | | |
|---|---|---|---|
| 5,119,468 | 6/1992 | Owens | 395/906 X |
| 5,159,660 | 10/1992 | Lu et al. | 364/165 X |
| 5,175,678 | 12/1992 | Frerichs et al. | 364/165 X |
| 5,191,521 | 3/1993 | Brosilow | 364/149 X |
| 5,267,139 | 11/1993 | Johnson | 364/148 |
| 5,268,835 | 12/1993 | Miyagaki et al. | 364/157 X |

OTHER PUBLICATIONS

"Theory and Practice of a Plate Rolling", Iron and Steel Institute of Japan, Sep. 1, 1984, pp. 289–292.
"Introduction and Practice of Neuro Computer", K. Nakamura, Gijutsu Hyoronsha, Sep. 15, 1990.
"Modern Control Engineering":, T. Tsuchiya, et al., Sangyo Tosho, Apr. 1991, pp. 141–152.

*Primary Examiner*—Joseph Ruggiero
*Attorney, Agent, or Firm*—Antonelli, Terry, Stout & Kraus

[57] ABSTRACT

A method and an apparatus for controlling an object by giving commands to actuators that control the object to perform desired operations, wherein relationships between respective values of parameters of the model for the controlled object and the input/output states of the model are obtained by learning, the obtained relationships are stored in a memory unit as a result of the learning, parameter values of the model are decided by referring to the learning result stored in the memory unit based on the input/output measured values of the controlled object, and commands are obtained based on the decided parameter values and the obtained commands are given to the actuators.

20 Claims, 16 Drawing Sheets

| | | | |
|---|---|---|---|
| $P_{i1}, V_{i1}$ | $P_1\ \nu_{R1}\ h_1\ \tau_{f1}$ | $U_{i1}$ | $W/_1$ |
| $P_{i2}, V_{i1}$ | $P_2\ \nu_{R1}\ h_2\ \tau_{fn}$ | $U_{i2}$ | $W/_2$ |
| ⋮ | ⋮ | ⋮ | ⋮ |
| $P_{in}, V_{in}$ | $P_n\ \nu_{R3}\ h_2\ \tau_{fn}$ | $U_{in}$ | $W/_n$ |

~20

PLASTIC CURVE OF THE OBJECT IN ROLLING (ROLLING LOAD EXPRESSION)

GAUGE METER EXPRESSION $$h = \frac{p}{k} + S$$

INFLUENCE COEFFICIENTS $$\frac{\delta p}{\delta h}$$

METHOD AND DEVICE FOR CONTROLLING OBJECT TO BE CONTROLLED USING LEARNING FUNCTION

BACKGROUND OF THE INVENTION

1. Field of the Invention

The present invention relates to a method and a device for controlling an object to be controlled, and more particularly to a set up control method and a set up control device for deciding a set point of a nonlinear control system such as a rolling mill.

2. Description of the Related Art

It is possible to carry out a high-precision control of a set up for deciding a set point of a control system when a linear control theory which has been developed based on a linear control system is used. However, even if this linear control theory is applied to an object of strong nonlinearity to be controlled such as, for example, a rolling mill for rolling a material, it is not possible to expect a desired level of control performance and it is not possible to improve the quality of the product (a steel material in the case of the rolling mill) to a high level. As a control system for controlling a rolling mill, a set up control system is available for obtaining a set point in a steady state when there is no time change in the controlled object, and a method for obtaining a high-precision control of the set up control system has been desired. This set up control is referred to as a set point control in the control of a thermoelectric power generator and a plant control.

Usually, in a set up control system, an optimal solution is obtained based on a dynamic programming or linear programming method, by disregarding a time change factor, in the same manner as when a stationary solution of a differential equation is obtained, thus determining a set point. Once the set point has been obtained, feedback control is carried out based on a linear control theory, according to which an object to be controlled is linearized around the set point to set an error from the set point to zero, as a regulator, and an optimal solution is obtained for a transient solution of the differential equation.

The set up control is described in detail in "The Theory and Practice of a Plate Rolling" by The Iron and Steel Institute of Japan, issued on Sep. 1, 1984, pp. 289–292.

In the above-described prior-art technique, it has been always the case that a control model for deciding a set point for a set up control (or a set point control) always changes. In the case of a rolling mill, for example, there are too many unknown parameters. Further, even if the value of each parameter has been decided it is usually the case that the value of each parameter, once decided, is easily changed due to changes in environmental factors, such as, for example, the value of the frictional resistance changes and the roll expands due to heat generated during the rolling operation. Since it is difficult to accurately decide changed values of parameters, the set point once decided by the set up control changes greatly and thus parameters of the feedback control also change, with a result that it is impossible to obtain a product (a steel product in the case of the rolling mill) of satisfactory quality.

SUMMARY OF THE INVENTION

It is therefore an object of the present invention to provide a control method and a control device which can ensure a satisfactory set up control (a set point control) having improved precision of control for deciding a set point for satisfactory control of an object of strong nonlinearity.

According to one aspect of the present invention, a method for controlling an object which gives commands to actuators that control the object so that the object performs a desired operation, includes a step of obtaining by learning a relationship between respective values of parameters of a model for the controlled object and input/output values of the model and storing the relationship thus obtained as a result of the learning in a memory unit, a step of deciding parameter values of the model by referring to the learning result stored in the memory unit based on input/output measured values of the controlled object, and a step of obtaining commands based on the parameters thus obtained and giving the obtained commands to the actuators.

Preferably, the model for the controlled object is a set up model, and the step for giving the above commands to the actuators decides target values of the input/output of the controlled object by the set up control based on the decided parameter values, obtains the commands and gives them to the actuators, and controls feedback so that an error is zero between the target values and the output of the output states obtained from the controlled object as a result of the commands.

Preferably, the above step of learning is carried out by using a neural network.

Furthermore, it is preferred that the above step of deciding the parameters is carried out by using a neural network.

In other words, according to the present invention, from the viewpoint of the fact that the drawbacks of the conventional set up control or set point control can not correspond to changes of the parameter values of the control model, a relationship between the control model and the parameter values is learned in advance and this relationship is stored, parameter values are estimated from the actual operation states of the controlled object based on the learning result, and the estimated parameter values are used as parameter values for the set up control and the feedback control of the control model.

According to a gauge control of a rolling mill of which set point changes greatly, it is difficult to specify parameters of the model of a controlled object at every moment of the rolling operation. Thus, according to the conventional method, it has been impossible to construct an accurate control model because the parameter values are changed due to various factors, and even a modern control theory which can improve the performance when the control model is accurate has been applied and found unable to fully, exhibit the ability. However, according to the present invention, it is possible to generate an accurate control model which can be applied to an object to be controlled that has strong nonlinear characteristics, and it is also possible to improve the control performance. Accordingly, it is possible to improve the precision of the set up control (or the set point control) for deciding a set point to control the object of strong nonlinearity, with a satisfactory result of the control.

DESCRIPTION OF THE PREFERRED EMBODIMENTS

Embodiments of the method and device for controlling an object to be controlled according to the present invention will be explained with reference to the attached drawings. In the following embodiments, the present invention is applied for the control of a nonlinear object, such as the control of a plate thickness shape (gauge control) of a rolling mill, for example.

Figure 3:
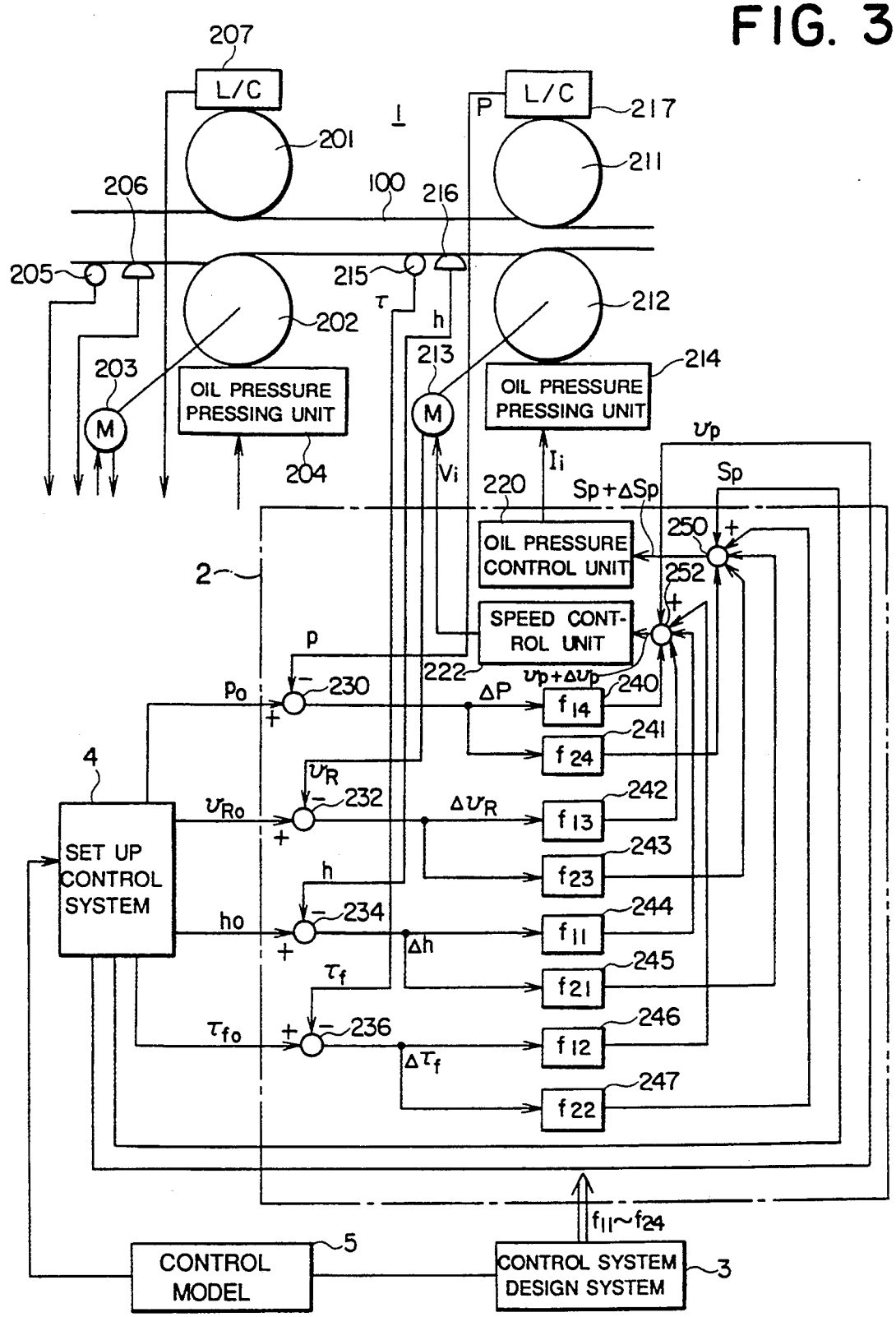
FIG. 3 is a block diagram for showing the control device of the above embodiment which is used for a rolling mill.

As shown in FIG. 3, for example, a rolling mill passes an object to be rolled 100 through between a plurality of pairs of rolls (only two pairs in the example shown in FIG. 3) 201, 202, 211 and 212, and the rotation speeds of each one of the pairs of rolls 202 and 212 are controlled by motors 203 and 213 respectively. At the same time, positions at which the rolls 202 and 212 pressingly roll the rolled object 100 are controlled by oil pressure pressing units 204 and 214 respectively. Thus, the plate thickness of the rolled object is set at a desired value. Control of the motor 213 and the oil pressure pressing unit 214 corresponding to the pair of rolls 211 and 212 which are actuators of the controlled object, for example, is carried out by giving a speed command value Vi and a pressing position command value Pi to the motor 213 and the oil pressure pressing unit 214 from a speed command control unit 222 and an oil pressure control unit 220 respectively.

The rolling mill is controlled in the following manner. Description will be made of only the control of the pair of rolls 211 and 212. Other pairs of rolls are also controlled in a similar manner.

At first, by using a control model 5 of the rolling mill for the rolled object, a set up control system 4 outputs a target load $p_o$, a target speed $V_{Ro}$, a target plate thickness $h_o$ and a target tension $\tau_{fo}$, and these values are given to subtractors 230, 232, 234 and 236 within the control unit 2 respectively. In the mean time, the subtractors 230, 232, 234 and 236 are also given, respectively, a load value p from a load cell for a roller 217, a speed value $V_R$ of the motor 213 from the motor 213 for driving the roller 212, a plate thickness value h from a plate thickness meter 216 for measuring the plate thickness of the rolled object, and a tension value $\tau_f$ from a tension meter 215 for measuring the tension of the rolled object. Then, the values of P, $V_R$, h and $\tau_f$ are subtracted from the values of $P_o$, $V_{Ro}$, $h_o$ and $\tau_{fo}$ respectively, to obtain deviations $\Delta p$, $\Delta V_R$, $\Delta h$ and $\Delta \tau_f$.

A control system design system 3 obtains feedback parameters $f_{11}$ to $f_{24}$ of an optimal control based on the control model 5 in a method to be explained later, and gives $f_{11}$ to $f_{24}$ to a control unit 2. The control unit 2 multiplies the feedback parameter values $f_{14}$, $f_{13}$, $f_{11}$ and $f_{12}$ with the corresponding deviations $\Delta p$, $\Delta V_R$, $\Delta h$ and $\Delta \tau_f$ by using multipliers 240, 242, 244 and 246 respectively, to obtain a speed command deviation $\Delta V_P = f_{14}\Delta p + f_{13}\Delta V_R + f_{11}\Delta h + f_{12}\Delta \tau_f$, and applies this $\Delta V_P$ to an adder 252. Further, the control unit 2 multiplies the feedback parameters values $f_{24}$, $f_{23}$, $f_{21}$ and $f_{22}$ with the corresponding deviations $\Delta P$, $\Delta V_R$, $\Delta h$ and $\Delta \tau_f$ by using multipliers 241, 243, 245 and 247 respectively, to obtain $\Delta S_P = f_{24}\Delta P + f_{23}\Delta V_R + f_{21}\Delta h + f_{22}\Delta \tau_f$, and applies the $\Delta S_P$ to an adder 250.

A set up control system 4 gives a speed set up value (a target speed command) $S_p$ and a pressing position set value (a target pressing position command) $V_p$ to the adders 250 and 252 based on the control model. Accordingly, the adders 250 and 252 add the command deviations $\Delta S_p$ and $\Delta V_p$ and the command values $S_p$ and $V_p$ respectively and apply the sums to an oil pressure control unit 220 and a speed control unit 222 respectively.

An embodiment of the present invention will be explained with reference to the drawings.

Figure 1A:
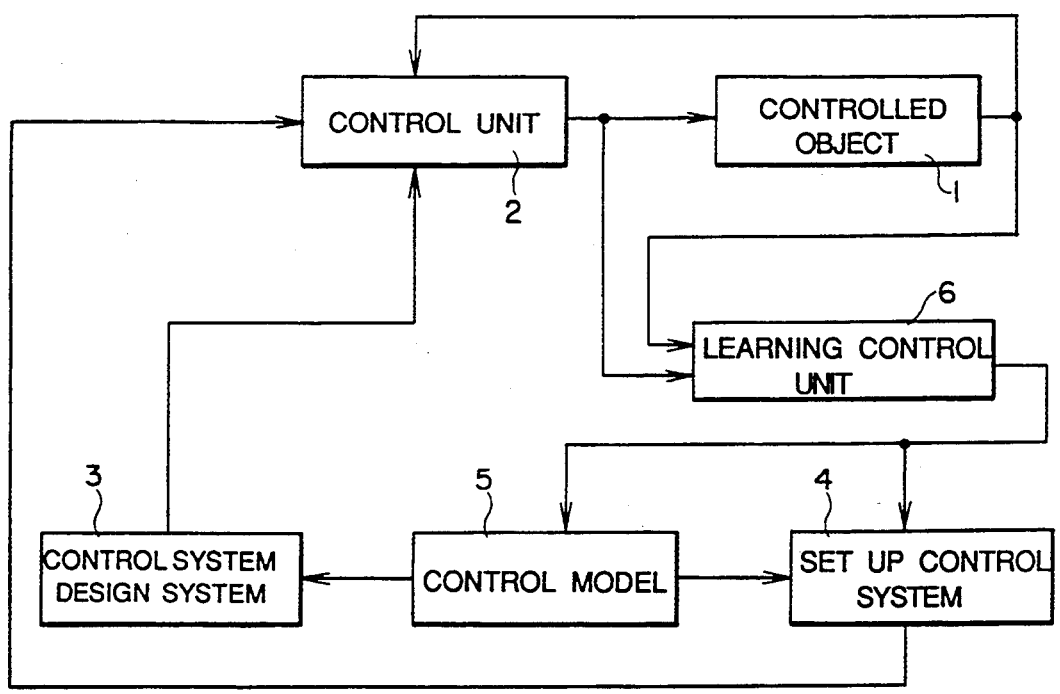
FIG. 1A is a block diagram for showing a control system of the control device for an object to be controlled according to one embodiment of the present invention.

FIG. 1A is a configuration diagram of a control unit for controlling an object to be controlled according to one embodiment of the present invention. A controlled object 1 operates with a desired level of precision based on a command sent from a control unit 2. The control unit 2 has a feedback control system for deciding a command deviation based on the state of the controlled object 1 and the control structure or parameters decided by a control system design system 3, adds this command deviation to a set point command value (hereinafter to be referred to as a target value) from a set up control system 4 for deciding a set point based on the nonlinearity of the controlled object 1, and generates a command to the controlled object 1. In this case, the feedback control system is called a DDC (Direct Digital Control) system and has a function of structuring a regulator system for setting a deviation (an error) from the target value to zero based on the states or control quantities of the controlled object.

A set up control system 4 decides a set point by utilizing a control model 5 for the controlled object 1. The control model 5 is structured by a plastic curve of an object in rolling, a rolling force function, an influence of tension and oil film thickness compensation, in the case of a rolling mill. For example, as a rolling force function, a "Hill's approximating expression" (1) which is an approximation of the "Bland & Ford" expression is used $$Pi = b \cdot ki \cdot \kappa i \cdot D_{pi} \cdot \sqrt{R_i' \cdot (Hi - hi)} \quad (1)$$

where
b is a width of a strip
ki is a constrained yield stress
$D_{pi}$ is a friction compensation term
hi is delivery gauge of i-th stand $$D_{pi} = a_1 - a_2 \cdot ri + a_3 U_i \cdot r_i \sqrt{1 - ri} \cdot \sqrt{\frac{R_i'}{hi}} \quad (2)$$

where $a_1$, $a_2$ and $a_3$ are constants and a coefficient of friction Ui is given by an expression (3).

$$ui = u_{oi} \cdot \left( u_{c1} + \frac{u_{c2}}{u_{c3} + V_{oi}} \right) \quad (3)$$

where
$u_{oi}$ is a constant (depending on a lubricant)
$u_{ci}$ is a roll speed
$r_i$ is a pressing rate of an i-th stand
Ri is a work roll diameter of an i-th stand
Hi is a plate thickness at the input side of an i-th stand
Ki is an influence term of tension of an i-th stand
Ri' is a roll plane (an expression of "Hitchcock")

A control of a physical expression for structuring the control model 5, for example, the coefficient of friction ui, is influenced by an operating temperature of the rolling mill or a rolling oil (a lubricating oil) and therefore changes greatly in an actual rolling. In other words, although it is relatively clear that a structure of the control model 5 for the controlled object 1 can be shown by an expression, in many cases the parameter values are easily changed due to the changes in the operating conditions such as the change in the roll speed. It is not possible to prepare an accurate control model 5 unless it is possible to decide parameter values such as the constants a1, a2, a3, the coefficient of friction $u_i$, $k_i$, $u_{oi}$ and $u_{ci}$.

Reasons for a change of parameter values of the model 5 will be explained below.

When a rolled object is regarded as an elastic material, a gauge meter expression $$h = s + \frac{R_o}{k} \quad (4)$$

Figure 4:
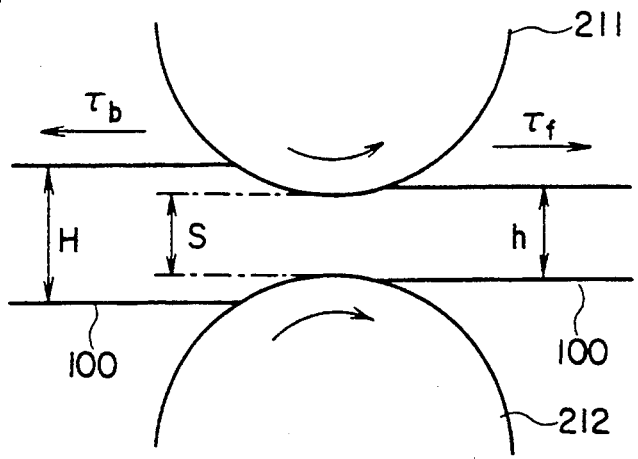
FIG. 4 is a diagram for showing a relationship between a rolled object and rolls.

(shown in FIG. 5) can be obtained. As shown in FIG. 4, S is a plate thickness immediately between the apex of the rolls, and this plate thickness S is smaller than the actual plate thickness by P/K to have a small plate thickness due to a spring effect. When the rolled plate leaves the position immediately below the rolls, the pressing load is released,
where
H is a plate thickness at the input side of the rolls
S is a distance between the rolls
h is a plate thickness at the output side of the rolls
k is an elastic coefficient of the rolled plate
p is a load.

Figure 5:
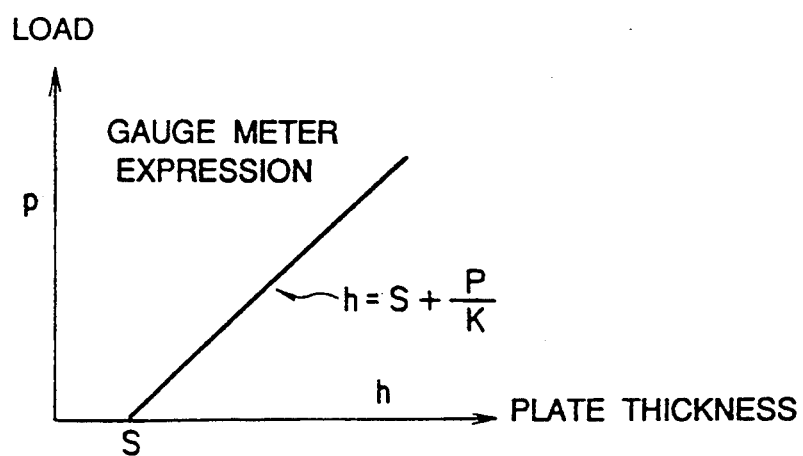
FIG. 5 is a diagram for showing characteristics of a gauge meter expression.
Figure 6:
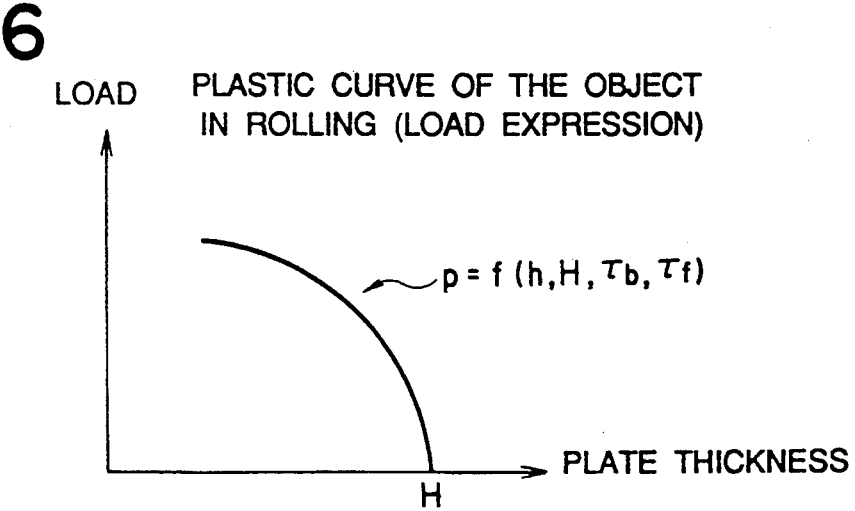
FIG. 6 is a diagram for showing a plastic curve of an object in rolling.
Figure 7:
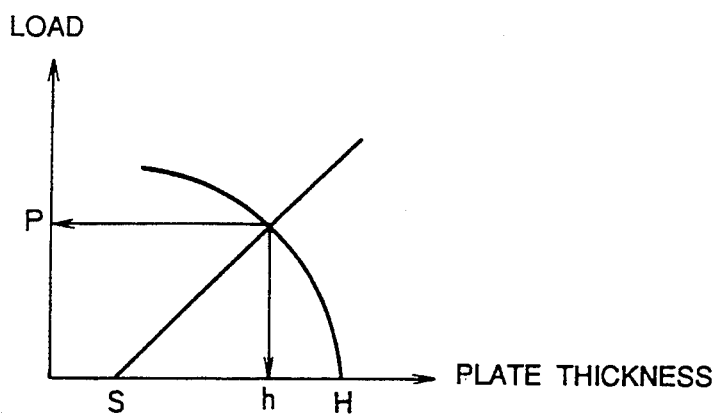
FIG. 7 is a diagram for showing operation points of a rolling mill.

The expressions (4) and (1) are given in charts as shown in FIGS. 5 and 6 respectively. In the plastic curve of an object in rolling shown in FIG. 6, a point of intersection between the curve and the x axis is the point which shows a plate thickness at the input side where the load is zero. Set points of the rolling mill are given as a point of intersection between the characteristic curve of the gauge meter expression in FIG. 5 and the plastic curve in FIG. 6, as shown in FIG. 7.

When the plate thickness of the rolled plate (a plate thickness at the input side) changes from H to $H_o$, the plastic curve of an object in rolling makes a parallel shift from a dotted line to a solid line (in this case, the point of intersection with the x axis moves from H to $H_o$). A target plate thickness changes from h to $h_o$ and a target load changes from p to $p_o$.

Figure 8:
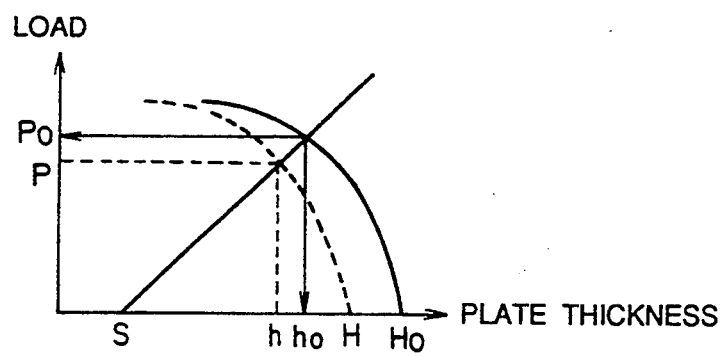
FIGS. 8 to 10 are diagrams for showing changes of operation points of a rolling mill according to changes of respective operation conditions.
Figures 9, 10:
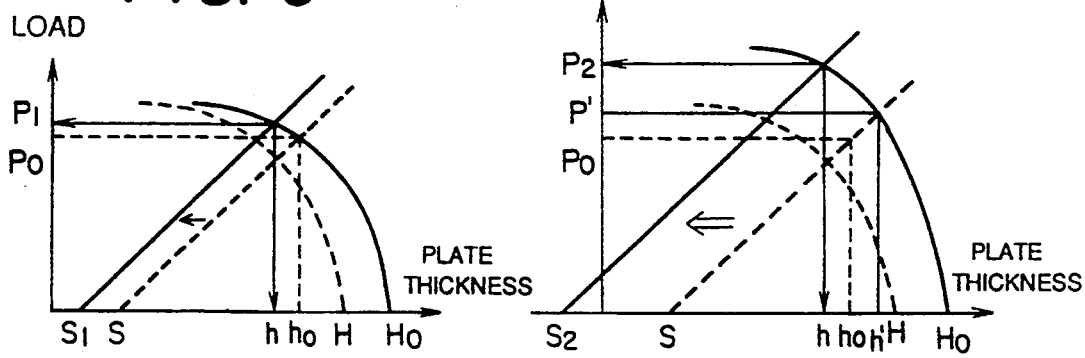

When the pressing position is changed from S to $S_1$ by an automatic control, the gauge meter expression moves from a dotted line to a solid line to have the relationship as shown in FIG. 9. The target load moves from $P_o$ in FIG. 8 to $p_1$ in FIG. 9 but the target plate thickness returns from $h_o$ to h.

In other words, according to the automatic control, $\Delta h = (h - h_o)$ and $\Delta P = (P - P_o)$ are detected, $\Delta S_p = f_1 \Delta h + f_2 \Delta p$ is fed back to obtain a pressing command deviation, and this pressing command deviation is added to the target value S to issue a pressing command $S_p = S + \Delta S_p$, where $f_1$ and $f_2$ are feedback coefficients. However, when the parameter values of the plastic curve of an object in rolling have changed due to a change of the operating condition such as a change of the speed $v_p$ and the plastic curve of an object in rolling has changed from a dotted line to a solid line in FIG. 10, it is necessary to move the position to $S_2$ in order to obtain an output side plate thickness h which is the same as that of FIG. 9. The load becomes $P_2$ in this case. In this case, although it is necessary to feed back the plate thickness by $\Delta h = h' - h$ and feed back the load by $\Delta P = P' - P_o$, the plate thickness and the load are actually fed back by only $h_o - h$ and $P_1 - P_o$ respectively, because the plastic curve of an object in rolling expressed by the solid line in FIG. 10 is not known accurately. In other words, based on the feedback coefficient obtained from the plastic curve of an object in rolling in FIG. 9, it is not possible to produce a command for bringing the pressing position to the point of $S_2$ that is actually required. Accordingly, it is necessary to obtain correct parameter values which follow the change of the operating conditions and then change the coefficients of $f_1$ and $f_2$ based on the correct parameter values.

According to one example, an input and an output of the controlled object 1 are input to a learning control unit 6 and parameters of the control model 5 are output from the learning control unit 6. In this case, the parameters of the control model 5 can be decided based on the operation at each moment of the controlled object 1. Therefore, it is possible to decide parameters which change every moment, such as time changes and temperature changes.

Based on a simulation, a relationship between the parameters of the model 5 for the controlled object and states (hereinafter inputs to the controlled object 1 and the control model 5, outputs from the controlled object 1 and the control model 5 and an internal state of the model 5 are collectively referred to as "states") is stored in advance in the learning control unit 6. When the states of the controlled object 1 have been input to the learning control unit 6, the learning control unit 6 refers to the relationship between the parameters and the states that has been stored and estimates values of the parameters based on the states at the set point. If the structure of the model 5 for the controlled object 1 is relatively accurate, values of the parameters at this point of time can be obtained with high precision.

Figure 1B:
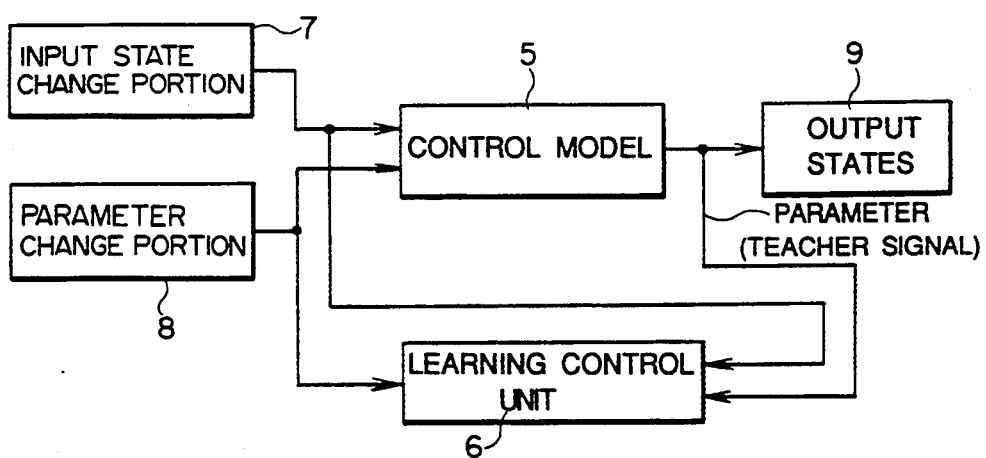
FIG. 1B is a block diagram for showing a learning system according to the above embodiment of the present invention.

FIG. 1B is a configuration diagram for making the learning control unit 6 learn and store the relationship between the parameters and the states. An input state of the control model 5 is decided by an input state changing portion 7 and parameter values are changed by a parameter changing portion 8, and thus a simulation is carried out. As a result of the simulation of the control model 5, an output state 9 which changes according to a change of a parameter value is obtained. The relationship between the parameter values and the states of the control model 5 is stored in the learning control unit 6. A multi-layer neuro computer having a functional interpolation capacity (general purpose capacity) can be utilized as the learning control unit 6.

Figure 2:
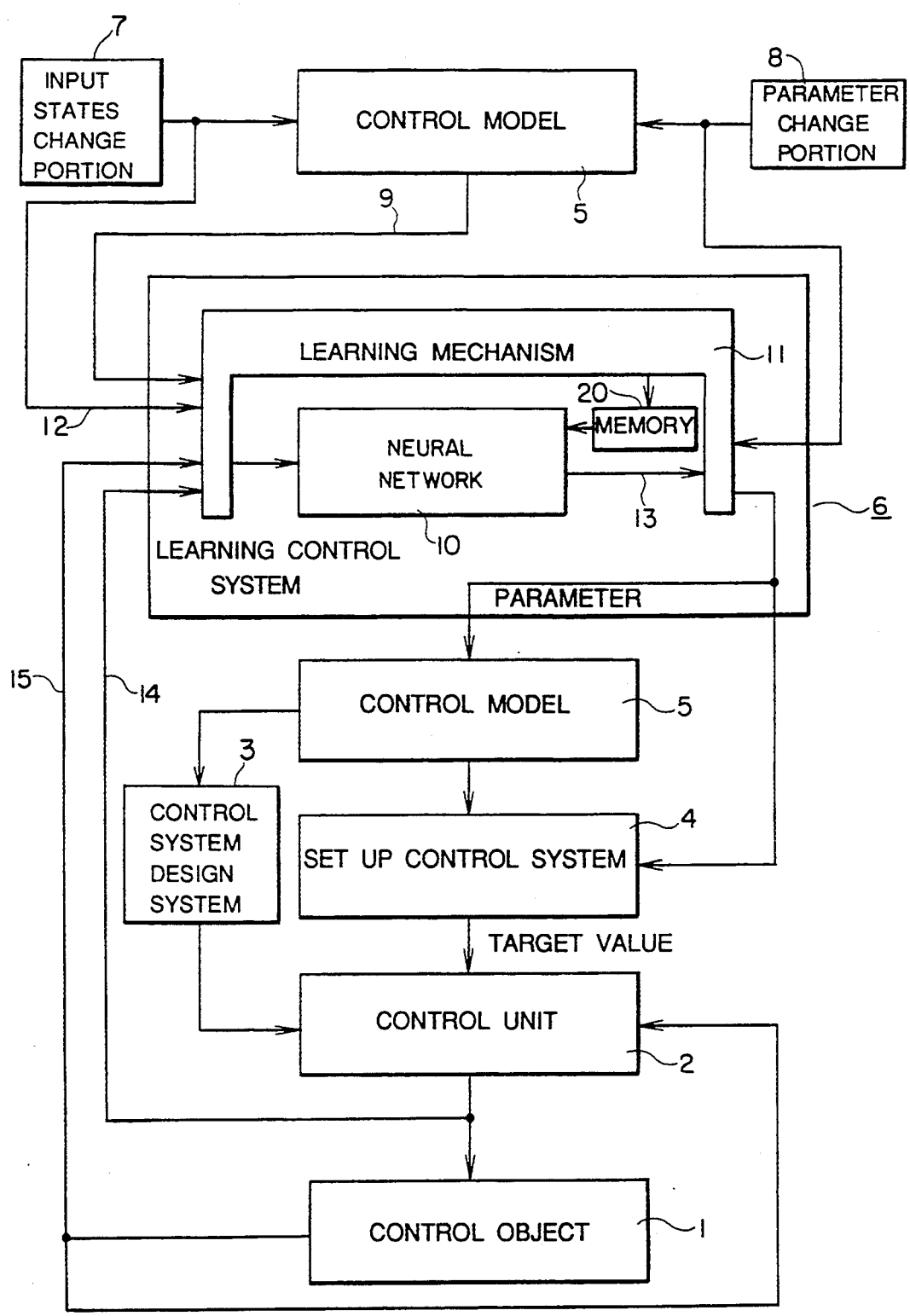
FIG. 2 is a block diagram for showing the whole of the control device according to the above embodiment of the present invention.

A configuration diagram of the whole of the control unit when a multi-layer neuro computer is used for the learning control unit 6 is shown in FIG. 2. The neuro computer is described in detail in "The Introduction and Practice of the Neuro Computer", edited by Kaoru Nakamura, Gijutsu Hyoronsha, issued on Sep. 15, 1990, and therefore, only the portion of the neuro computer which relates to the present embodiment will be explained.

Figure 11:
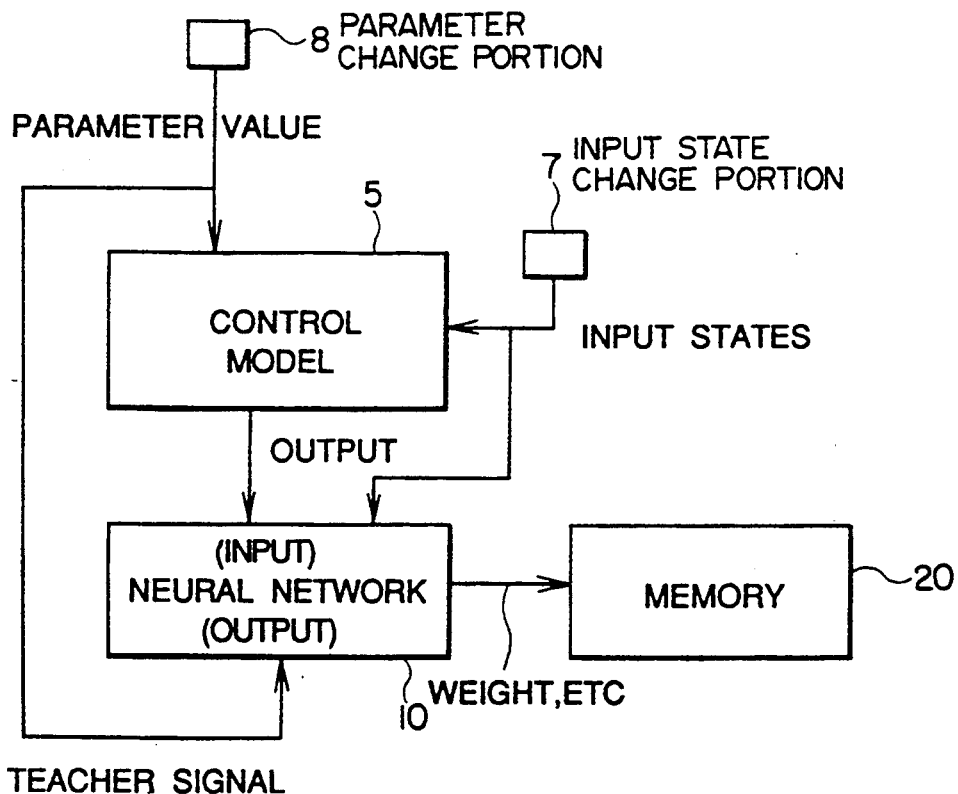
FIG. 11 is a configuration diagram for explaining the operation of a learning control device during learning.
Figure 12:
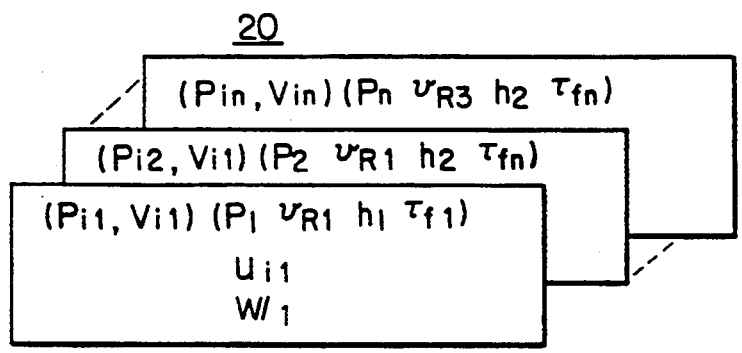
FIG. 12 is a diagram for showing data obtained by learning.

A neuro computer is structured by a neural network 10, a learning mechanism 11 and a memory 20, and the learning mechanism 11 controls "learning" and "idea generation". As shown in FIG. 11, when a certain parameter value (for example, a coefficient of friction ui) has been given to the control model 5 from the parameter changing portion 8 at the time of learning, the control model 5 obtains the output states such as the load P, the speed $V_p$, the plate thickness h and the tension $\tau_f$, based on the input state from the input state changing portion 7 such as the speed command value Vi, the pressing position and the command value Pi, and applies these output states to the input layer of the neural network 10. Further, the input states are given to the input layer and the parameters are given to the output layer as a teacher signal. The learning mechanism 11 learns by controlling these data. When the neural network 10 is in a position to yet learn, a random number or a suitable numerical value is given to the load coefficient (weight) of the neural network 10. Therefore, an output 13 of the suitable value is input to the learning mechanism 11. On the other hand, the parameters which are an output of the parameter changing mechanism 8 are input to the learning mechanism 11 as the teacher signal. The learning mechanism 11 corrects the load coefficient (weight) of the neural network 10 so that the squared deviation between the output of the parameter changing mechanism 8 and the output of the neural network 10 becomes minimum. When a set of an input 12 and an output 9 of the control model 5 has been input to the neural network 10, an output 13 becomes equal to the output of the parameter changing mechanism 8. This is called the learning of the neural network. As a result, the input and output states for each of the parameter values $ui_1$, $ui_2$, ..., $ui_n$ and a weighted matrix W of the neural network as shown in FIG. 12 can be obtained. These data are stored in a memory 20 as shown in FIG. 13.

In the above description, only the parameter Ui has been used to simplify the explanation. It is needless to mention that a plurality of parameters can also be learned, and in this case, input and output states and a weighted matrix can be obtained for each combination of the parameter values, in the manner described above.

Figures 13, 14:
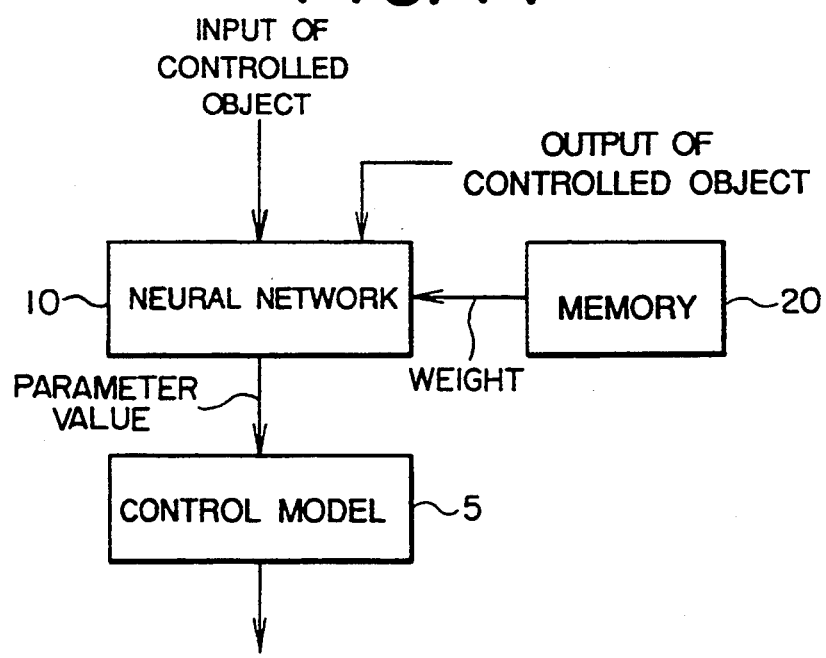
FIG. 13 is a diagram for showing a memory which stores data obtained by learning.
FIG. 14 is a configuration diagram for explaining the operation of a learning control device when control is carried out by using a result of the learning.

In the learning mechanism 11 after having ended the learning, input states 14, such as Vi and Pi, of the controlled object 1 and output states 15, such as P, $V_R$, R and $\tau_f$, of the controlled object 1, are input instead of the input 12 of the control model 5 and instead of the output 9 of the control model 5, respectively, to the input layer as input of the neural network 10 which is the structural element of the learning mechanism 11, as shown in FIG. 14. Then, the learning mechanism reads from the memory 20 the weighted matrix W corresponding to the input and output states that have been input, gives the W to the neural network 10, so that the neural network 10 obtains an output. The neural network 10 then outputs the obtained output as a parameter value, for example, vi, of the controlled object 1 to the control model 5. When the control model 5 has been changed based on this parameter value, the target values of the set up control system 4 are changed. The changed target values, such as $V_p'$ and $S_p'$, are input to the control unit 2.

On the other hand, based on the changed control model 5, the control system design system obtains feedback coefficients $f_{11}$ to $f_{24}$ and applies these to the control unit 2. The control unit 2 obtains command deviations based on the feedback coefficients and the target values and feeds back the result to the control unit 2. Upon receiving the target values and the feedback of the output of the controlled object 1, the control unit 2 sends a command to the controlled object 1. The command 14 of the control unit 2 which is the input state of the controlled object 1 and the output state 14 which is the output of the controlled object 1 are input to the learning mechanism 11.

The flow of the above operation will be explained with reference to FIGS. 15 and 16.

Figure 15:
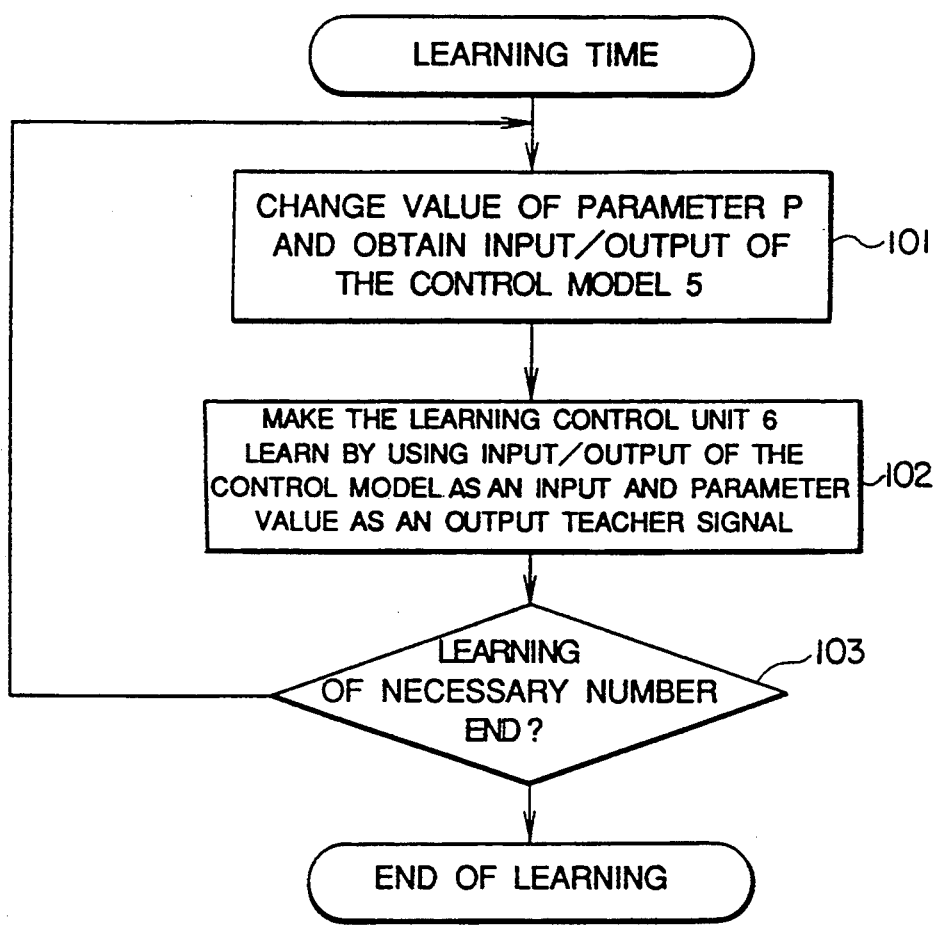
FIG. 15 is a flowchart for showing a learning procedure in the above embodiment.

FIG. 15 is a flowchart for showing the learning procedure of the learning control unit 6. At the learning time, parameter values that are the result of parameter values which have been changed by the parameter changing portion 8 are first input to the control model 5, at Step 101. Then, the control model 5 carries out a simulation based on the input parameter values, and obtains an input/output relationship of the control model 5, at Step 102. At Step 103, a decision is made as to whether the learning of a required number has been completed or not, The above Steps 101 and 102 are repeated until the learning has been completed. After the learning has been completed the control is carried out based on the result of the learning. The processing procedure is shown by a flowchart in FIG. 16.

Figure 16:
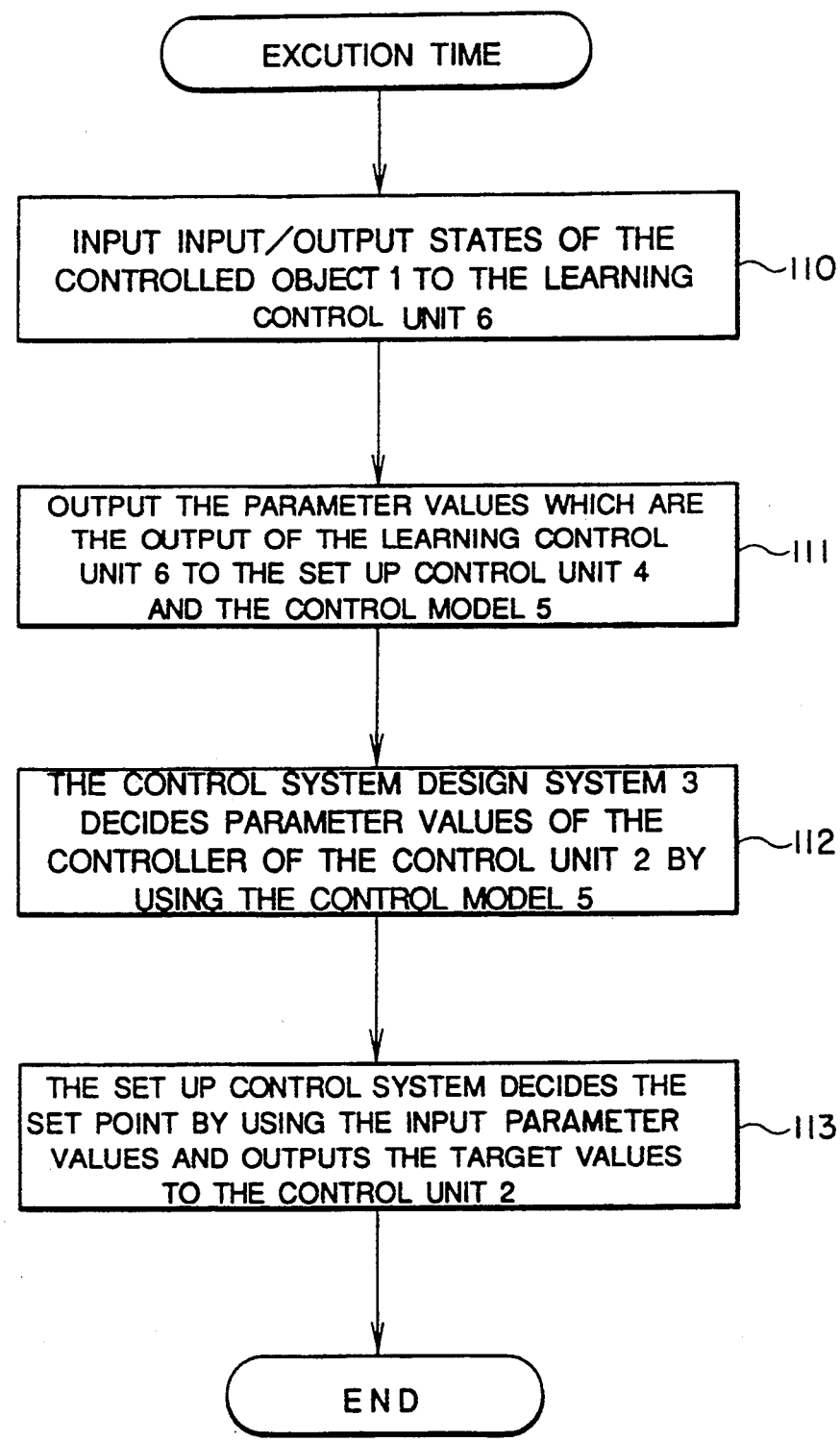
FIG. 16 is a flowchart for showing a control execution procedure in the above embodiment.

Referring to FIG. 16, at Step 110, the states of the input and output of the controlled object 1 are input to the learning control unit 6 at the time of executing the control. At Step 111, the learning control unit obtains parameter values of the time when the controlled object is being operated and outputs these values to the set up control system 4 and the control model 5. Next, at Step 112, the control system design system 3 decides a feedback parameter value and a feed forward parameter value of the control unit 2 by using the control model 5. At Step 113, the set up control system receives the parameter values output at the Step 111, decides a set point and outputs a target value to the control unit 2.

Figure 17A:
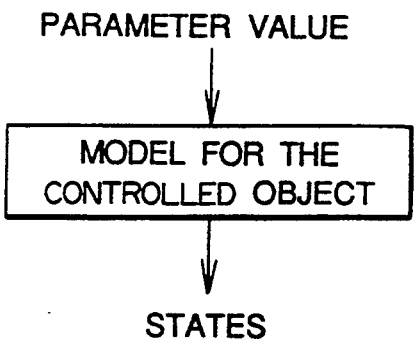
FIGS. 17A to 17C are diagrams for showing the learning procedures in the above embodiment.
Figure 17B:
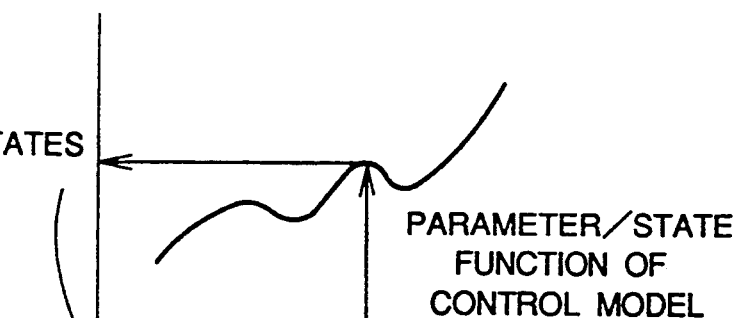
Figure 17C:
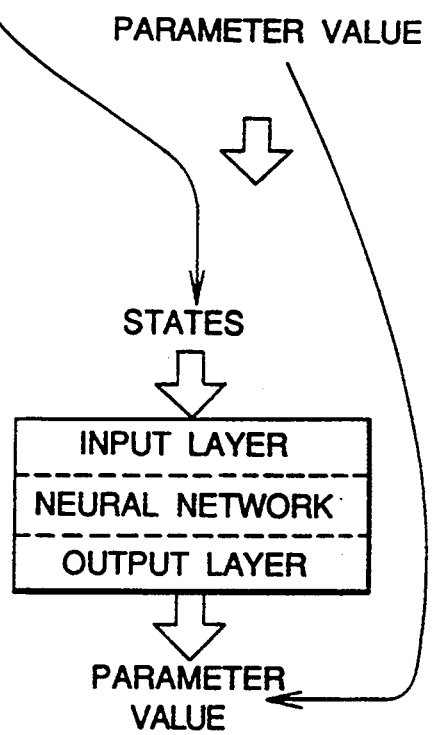
Figure 18A:
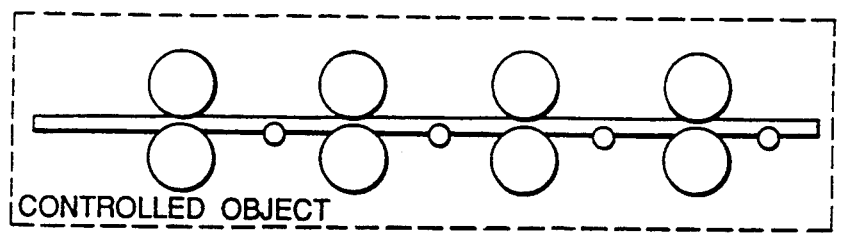
FIGS. 18A to 18D are diagrams for showing the estimating procedures in the above embodiment.
Figure 18B:
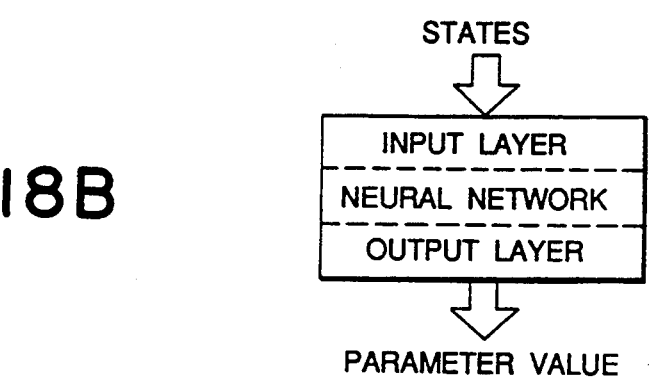
Figure 18C:
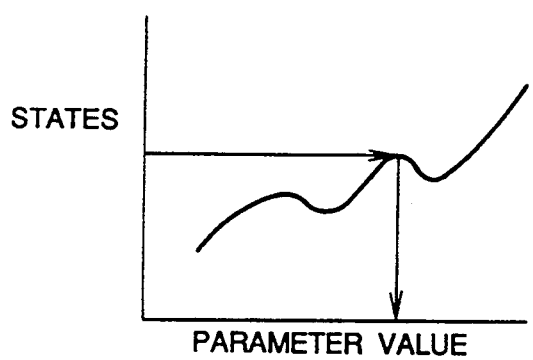
Figure 18D:
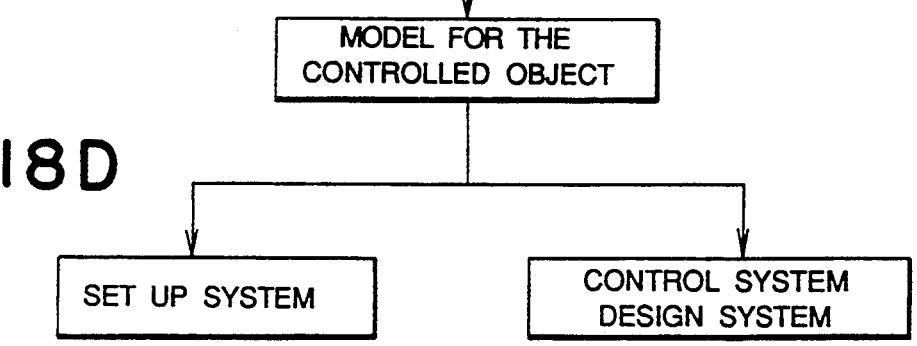

FIGS. 17A to 17C show examples of the operation when the above-described configuration has been arranged. FIG. 17A shows an example of the operation at the time of learning, where the states of the input and output of the control model 5 are obtained. FIG. 17B shows a relationship between the parameters and the states obtained in FIG. 17A. In other words, FIG. 17B shows a function of the states of the parameters of the control model 5. The neural network 10 is made to learn that the states are input to the input layer and the parameters are output from the output layer.

FIGS. 18A to 18D show how to use the neural network 10 when the operation is executed after the learning has been completed. When the states of the controlled object 1 shown in FIG. 18A have been input to the neural network 10, parameter values which are the result of the learning in the control model 5 at this point of time are output. This is called an inverse set up. The output of the neural network 10 shows optimal parameter values of the control model 5 when the controlled object 1 is being operated. When the parameter values have been input to the control model 5, the control model 5 executes the operation which is almost the same as the operation of the controlled Object 1. As a result, the set up system and the control system design system output optimal target values and the configuration of the control system or the parameter values of the control system, to thereby reduce control errors.

In the above-described embodiment, when the parameter values obtained by the inverse set up of the neural network are not correct, it is also good to set new parameter values directly from the parameter changing portion and apply them to the control model 5.

Next, description will be made as to how to obtain feedback coefficients $f_{11}$, $f_{12}$, $f_{13}$, $f_{14}$, $f_{21}$, $f_{22}$, $f_{23}$ and $f_{24}$ according to the modern control theory (for, example, "The Modern Control Engineering" by T. Tsuchiya and T. Ikegami, Sangyo Tosyo, April 1991, pp. 141~152).

In the rolling force function, (plastic curve of an object in rolling), speed terms are included as shown in the expressions (1) to (3).

Figure 19:
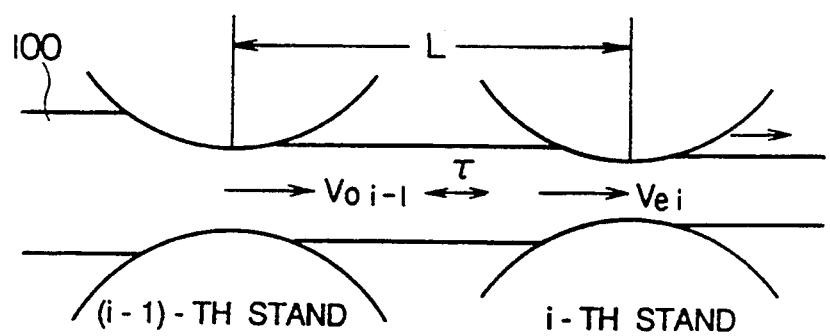
FIG. 19 is a diagram for showing a relationship between a rolled object and rolls.

The relationship between the speed of the object to be rolled and the tension of this object in two pairs of rolls (an (i−1)-th stand and an i-th stand) shown in FIG. 19, is expressed by the following:

$$\frac{d\tau}{dt} = \frac{Ebh}{L}(V_{ei} - V_{oi-1})$$

As for the expression, $\tau$ is a tension between the (i−1)-th stand and the i-th stand, and the tension is $\tau_b$ when viewed from the i-th stand, L is a distance between the stands, E is a Young's modules, b is a width of the rolled object, $V_{ei}$ is a speed of the rolled object at the input side of the i-th stand, and $V_{oi-1}$ is a speed of the rolled object at the output side of the (i−1)-th stand. By substituting the above relationship into the above-described expression (1) and others, the following relational expressions can be obtained:

$$\frac{dh}{dt} = g_1(h, \tau_f, V_R, p, V_p, S_p, t) \tag{5}$$

$$\frac{d\tau_f}{dt} = g_2(h, \tau_f, V_R, p, V_p, S_p, t) \tag{6}$$

$$\frac{dV_R}{dt} = g_3(h, \tau_f, V_R, p, V_p, S_p, t) \tag{7}$$

$$\frac{dP}{dt} = g_4(h, \tau_f, V_R, p, V_p, S_p, t) \tag{8}$$

Based on the load balance, etc. set points $\tau_{fo}$, $h_o$, $V_{Ro}$ and $P_o$ are obtained. The expressions (5) to (8) are Taylor exposed around the set points. The Taylor exposure will be carried out for the expression (5) only in this case, and the Taylor exposure for the expressions (6) to (8) will be omitted.

$$\frac{d}{dt}(h_o + \Delta h) = \frac{dh_o}{dt} + \frac{d\Delta h}{dt} = g_1(g_o + \Delta h, \tau_{fo} + \Delta \tau_f, \tag{9}$$

$$V_{Ro} + \Delta V_R, P_o + \Delta P, V_p + \Delta V_p, S_p + \Delta S = g_1(h_o, \tau_{fo}, V_{Ro}, P_o,$$

$$V_p, S_p, t) + \left(\frac{\partial g_1}{\partial h}\right)\Delta h + \left(\frac{\partial g_1}{\partial \tau_{fo}}\right)\Delta \tau_{fo} + \left(\frac{\partial g_1}{\partial V_R}\right)\Delta V_R +$$

$$\left(\frac{\partial g_1}{\partial p}\right)\Delta P + \left(\frac{\partial g_1}{\partial V_p}\right)\Delta V_p + \left(\frac{\partial g}{\partial S_p}\right)\Delta S_p + \epsilon$$

By substituting the expression (5) into the expression (9), a difference expression is obtained.

$$\frac{\partial g}{\partial h}$$

and others are influence coefficients.

$$\frac{dh}{dt} = \left(\frac{\partial g_1}{\partial h}\right)\Delta h + \left(\frac{\partial g_1}{\partial \tau_f}\right)\Delta \tau_f + \tag{10}$$

$$\left(\frac{\partial g_1}{\partial V_p}\right)\Delta V_R + \left(\frac{\partial g_1}{\partial p}\right)\Delta P + \left(\frac{\partial g_1}{\partial V_p}\right)\Delta V_p + \left(\frac{\partial g_1}{\partial S_p}\right)\Delta S_p$$

In the expressions (5) to (10), $\Delta h$ is a plate thickness error, $\Delta \tau_f$ is a front tension error, $\Delta V_R$ is a speed error, $\Delta P$ is a load error, $\Delta V_p$ is a speed command error, and $\Delta S_p$ is a pressing position command error. Partial differentiations have been carried out around set points obtained by the setups of $h=H_o$, $\tau_f=\tau_{fo}$, $V_p=V_{po}$, $P=P_o$ and $S_p=S_{po}$. Next, a state variable x will be expressed by vector expressions $$x = [\Delta h, \Delta \tau_f, \Delta V_R, \Delta P]^T \quad u = [\Delta S_p, \Delta V_p]^T.$$

When $$a_{11} = \left(\frac{\partial g_1}{\partial h}\right), a_{12} = \left(\frac{\partial g_1}{\partial \tau_f}\right), a_{13} = \left(\frac{\partial g_1}{\partial v_R}\right)$$

$$a_{14} = \left(\frac{\partial g_1}{\partial p}\right), b_{11} = \left(\frac{\partial g_1}{\partial V_p}\right), b_{12} = \left(\frac{\partial g_2}{\partial S_p}\right),$$

the expression (10) is expressed as follows:

$$\frac{dh}{dt} = a_{11}\Delta h_1 + a_{12}\Delta \tau_f + a_{13}\Delta V_R + a_{14}\Delta P + b_{11}\Delta S_p + b_{12}\Delta V_p \tag{11}$$

$$= [a_{11}\ a_{12}\ a_{13}\ a_{14}] \begin{bmatrix} \Delta h \\ \Delta \tau_f \\ \Delta V_R \\ \Delta P \end{bmatrix} + [b_{11}\ b_{12}] \begin{bmatrix} \Delta S_P \\ \Delta V_P \end{bmatrix}$$

$$= [a_{11}\ a_{12}\ a_{13}\ a_{14}] + [b_{11}\ b_{12}]\ u|$$

Similarly, the following expressions can be obtained.

$$\frac{d\tau_f}{dt} = [a_{21}\ a_{22}\ a_{23}\ a_{24}] \times + [b_{21}\ b_{22}]u| \tag{12}$$

$$\frac{dV_R}{dt} = [a_{31}\ a_{32}\ a_{33}\ a_{34}] \times + [b_{31}\ b_{32}]u| \tag{13}$$

$$\frac{dP}{dt} = [a_{41}\ a_{42}\ a_{43}\ a_{44}] \times + [b_{41}\ b_{42}]u| \tag{14}$$

The expression (11) to (14) are put together as follows.

$$\frac{ax}{dt} = \frac{d}{dt} \begin{bmatrix} \Delta h \\ \Delta \tau_b \\ \Delta V_R \\ \Delta P \end{bmatrix} = \begin{bmatrix} a_{11}\ a_{12}\ a_{13}\ a_{14} \\ a_{21}\ a_{22}\ a_{23}\ a_{24} \\ a_{31}\ a_{32}\ a_{33}\ a_{34} \\ a_{41}\ a_{42}\ a_{43}\ a_{44} \end{bmatrix} \times + \begin{bmatrix} b_{11}\ b_{12} \\ b_{21}\ b_{22} \\ b_{31}\ b_{32} \\ b_{41}\ b_{42} \end{bmatrix} u| \tag{15}$$

$$= A|\ x| + |B\ u|$$

This is the equation obtained. Based on this structure, a feedback coefficient can be obtained by the modern control theory.

Figure 21:
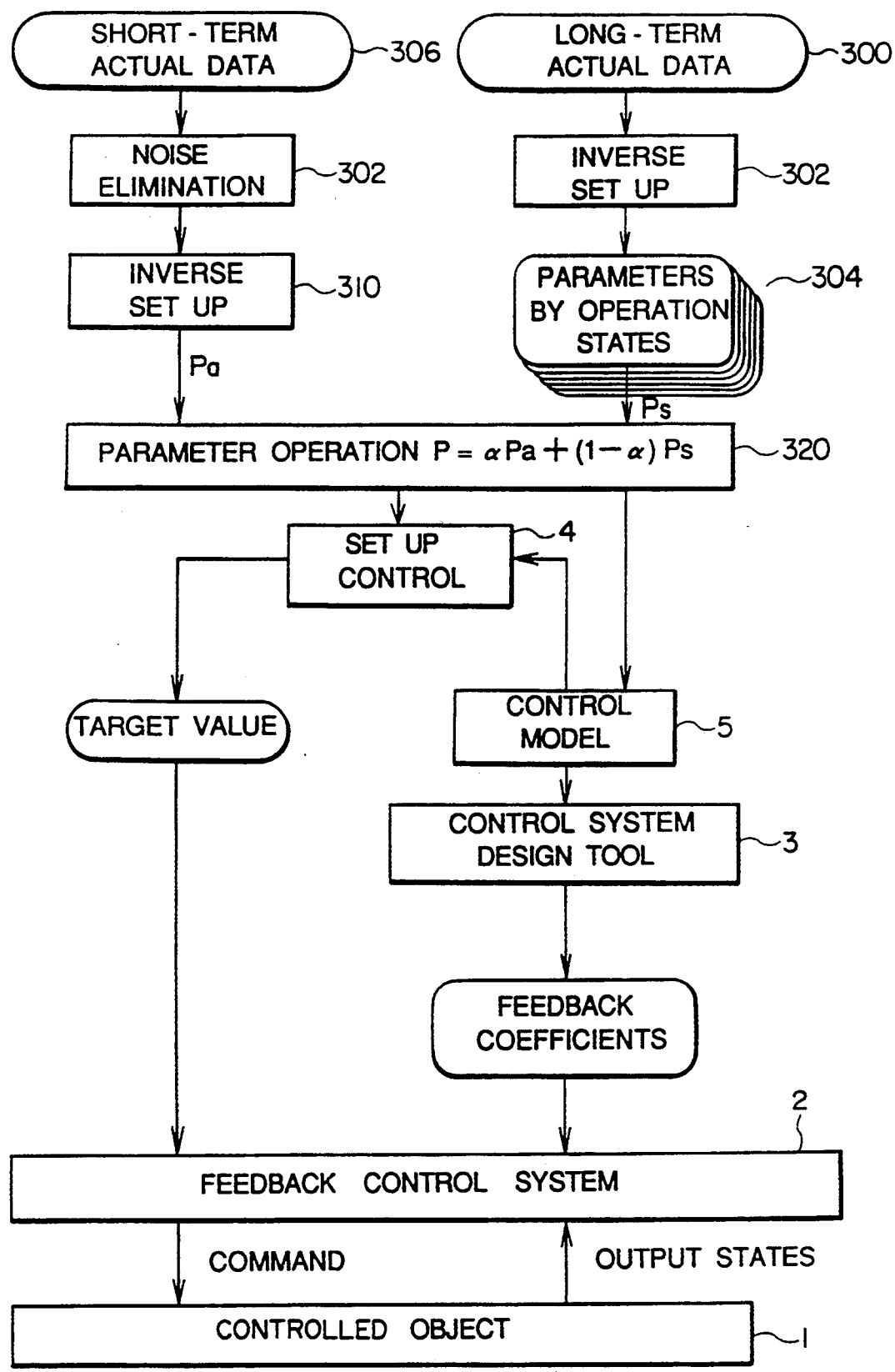
FIG. 21 is a diagram for showing the control procedure of the above another embodiment.
Figure 22:
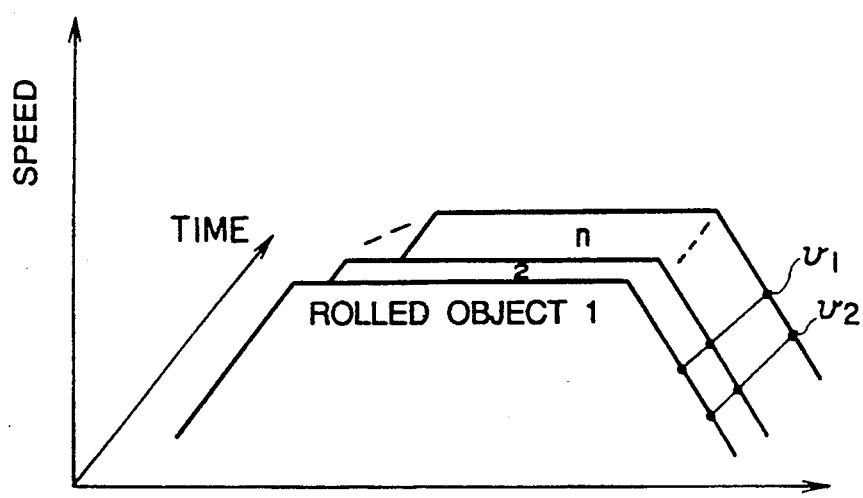
FIG. 22 is a diagram for showing the long-term actual data according to the above another embodiment.
Figure 23:
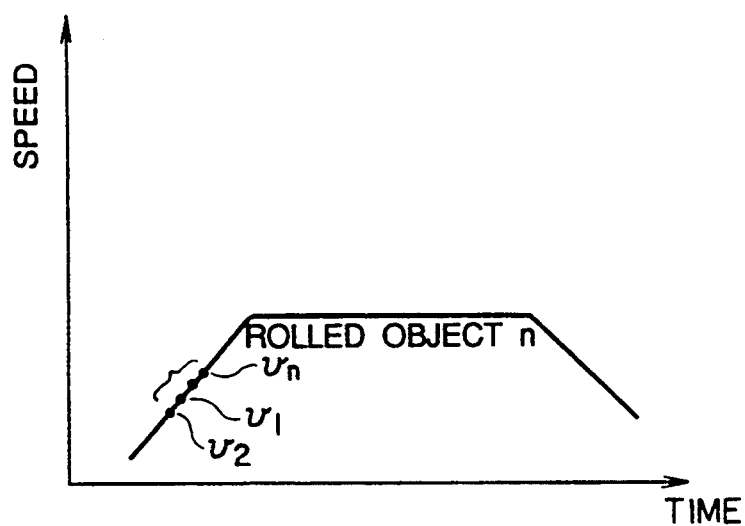
FIG. 23 is a diagram for showing the short-term actual data according to the above another embodiment.

Another embodiment of the present invention will be explained with reference to FIGS. 21 and 22. In FIGS. 21 and 22, reference symbols which are the same as those in the above-described embodiment have the same functions and their explanation will be omitted. In the present embodiment, parameter values are decided based on short-term data and long-term data of the input/output states of the controlled object.

As described above, it is necessary to change optimal feedback coefficients when the parameter values of the plastic curve of the object in rolling (the rolling force function) have changed.

There are many factors for a change in the plastic curve of the object in rolling. Even if rolled objects have the same specifications of the same component, same plate thickness, same plate width, etc., the plastic curves of these rolled objects are different for new rolls having been immediately replaced therein and for rolls that are old and have been abraded, for example. However, in this case, characteristics change gradually. To be more specific, a neuro operation is carried out for each rolling operation since after the rolls have been replaced, and characteristic data recorded in the memories (ref. 304 in FIGS. 20 and 21) are long-term actual data Ps by weighted average and moving average calculations using parameter values during the rolling operations.

In this case, since the plastic curves of the rolled objects are different depending on the speeds of rolling even if the rolled objects are the same type of steel and have the same specifications, parameter values are stored for each state of operation, e.g. acceleration operation, deceleration operation, and steady-state operation.

The long-term actual data are data of the input/output states of a controlled object which is obtained for rolled objects (e.g. rolled objects 1, 2, ..., n) of the same specifications of the same type of steel at each state value, such as at each level of speeds $V_1$, $V_2$, etc. The long-term actual data thus obtained are neuro operated (an inverse set up) and parameter values for each state value are obtained.

In the actual rolling mill, coefficients of friction such as the coarseness of the rolls (level of abrasion) and density of rolling oil change with time, and the input-/output states change with time accordingly. However, since the long-term actual data are obtained by averaging such time changes, the long-term actual data after the averaging cannot show changed values of the coefficients as momentary values.

In the mean time, data at the exit side of the rolling mill includes an abundance of noise, and therefore, it is necessary to eliminate the noise before, thereby effecting an inverse set up.

In the processing of the long-term actual data, noise is eliminated by using data of many rolled objects.

Short-term actual data are the input/output data of a pair of rolled objects at different speeds $V_1$ to $V_n$ during a short time period. Accordingly, data which reflects time change values such as momentary data of the coefficients can be obtained. From the short-term actual data, noise is similarly eliminated prior to an inverse set up (ref. block 308 in FIG. 21). In order to securely eliminate noise, it is necessary to average the long-term actual data. However, if the data collection period is taken longer to average the actual data, the speed states such as acceleration and deceleration states and steady speed state become different. Therefore, data collection time cannot take so long. Accordingly, there is a possibility that the parameter Pa obtained in the inverse set up by using the neuro operation includes noise.

In other words, the parameter value Pa obtained from the short-term actual data reflects the states of a momentary operation but is easily influenced by noise.

On the other hand, the parameter value Ps obtained from the long-term actual data is not easily influenced by noise but does not reflect a momentary state change of the rolling mill.

Thus, the following parameter operation is carried out and the long-term data and short-term data (ref. block 320 in FIG. 21) are utilized.

$$P = \alpha P a + (1 - \alpha) Ps$$

In this case, α takes a value between 0 and 1. When the α is set closer to 1, the short term data is reflected and the long-term data is disregarded. When the α is set to 0, the long-term data is reflected and short-term data is disregarded.

A small value of the α is taken when the number of data is large that has been used to obtain the long-term data and when the rolling operation has been stable.

A large value of the α is taken when there is no long-term data, or when rolls have just been replaced because there is a large difference in parameter values between these new rolls and the long-term data, or when a steel material which has never been used is used.

Figure 20:
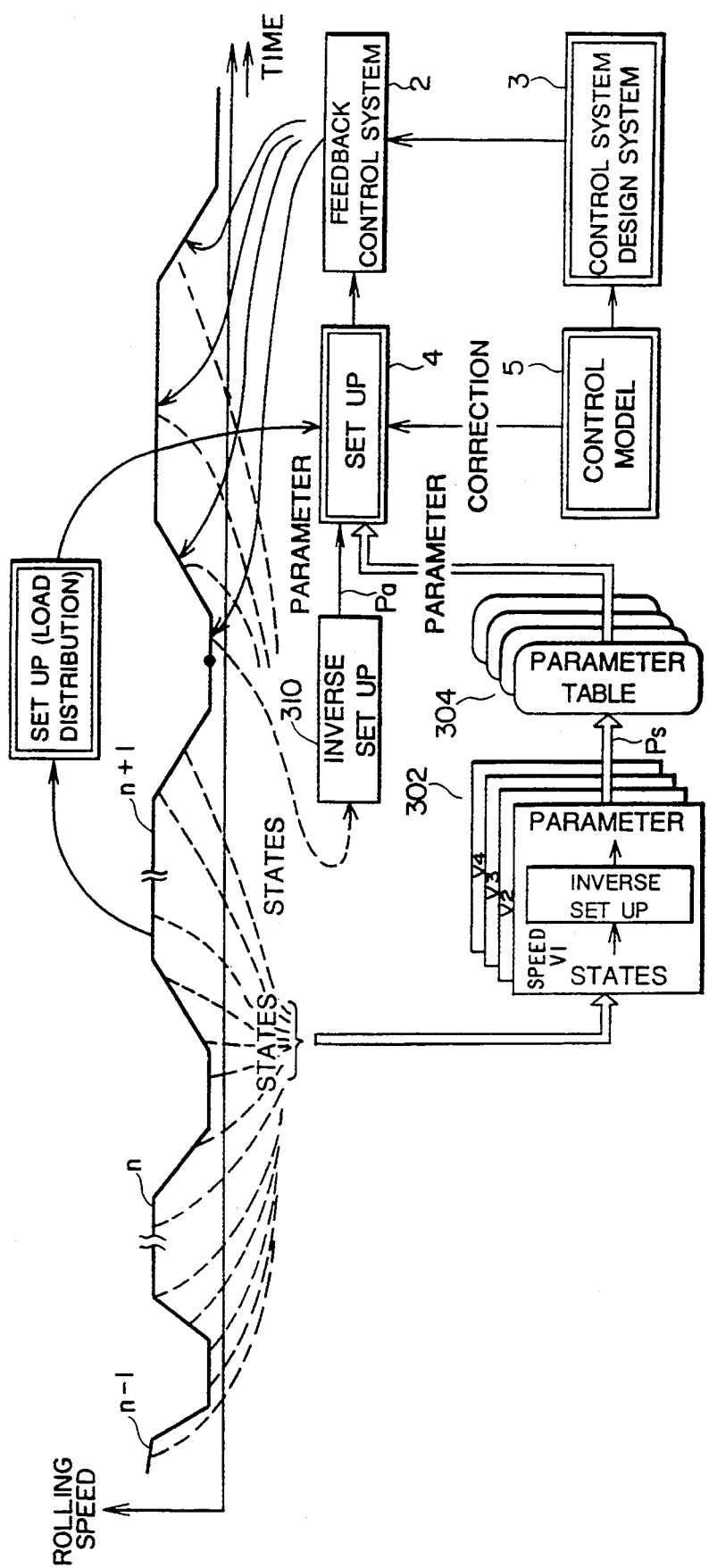
FIG. 20 is a diagram for showing the operation of another embodiment of the present invention.

An example of the operation having the above structure will be explained with reference to FIG. 20. Data of the (n−1)-th rolled object corresponding to states of various speeds, including acceleration, deceleration, steady speed operation and slow speed operation, are collected and these data are put together with the similar data collected from the rolling operations of the 1st to the (n−2)-th rolled objects. The data thus put together are neuro operated (inverse set up) and the parameter value Ps of the long-term actual data is obtained, as shown in block 302. The parameter Ps is stored in the parameter table 304 for each specification of each operation state.

When the rolling of the n-th rolled object is about to be started, the neural net obtains the parameter value Pa by using the short-term actual data, as shown in block 310.

By using the parameter values Ps and Pa, the above operation P=αPa+(1−α) Ps is carried out, to estimate the parameter value P at this point of time. By using the value P, the control model 5 is changed and the set up is executed. At the same time, the control system design tool 3 obtains the feedback parameters $f_{11}$, $f_{12}$, $f_{13}$, $f_{14}$, $f_{21}$, $f_{22}$, $f_{23}$ and $f_{24}$ of the optimal control based on the control model 5, and passes these feedback parameters to the feedback control system 2.

The feedback control system 2 obtains a command error from the states of the rolling mill and the feedback parameters, adds the target values of the set up to the command error, and generates the command to the rolling mill.

As a result, the feedback control system can generate a command which is suitable for the operation of the rolling mill, and thus can make a satisfactory response.

Figure 24:
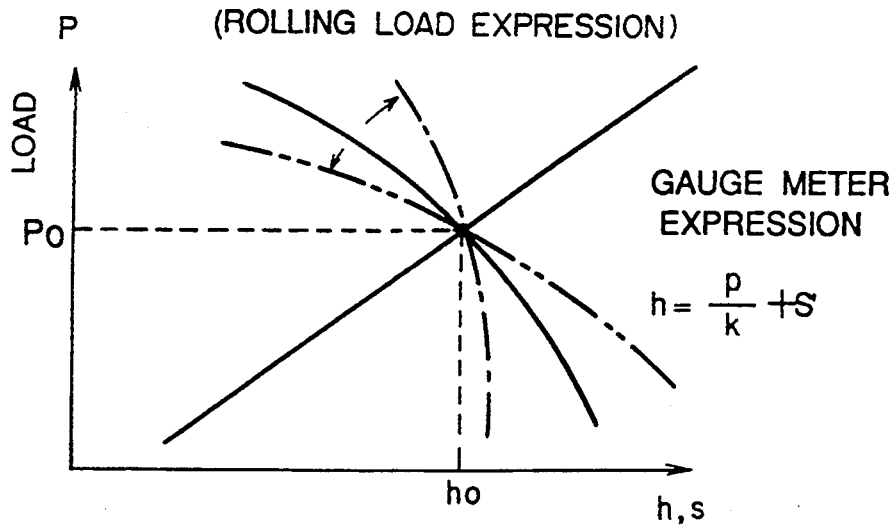
FIG. 24 is a diagram for showing the variations of the model due to the change of parameters of the rolling mill.
Figure 25:
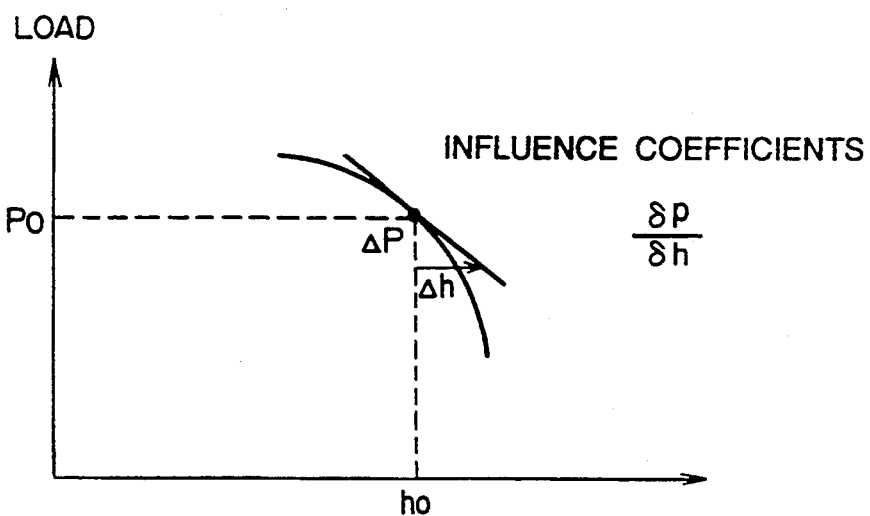
FIG. 25 is a diagram for showing coefficients of influence.

As described above, according to the present invention, it is possible to accurately decide parameter values of the control model. Therefore, even if parameter values have changed and the plastic curve of the object in rolling has changed as shown in FIG. 24, the influence coefficients such as $$\frac{db}{dh}$$

can be obtained accurately as shown in FIG. 25. As a result, correct feedback coefficients can be obtained, with an improved control performance.

According to the gauge control of a rolling mill of which set point changes greatly, it is difficult to specify parameters of the model of a controlled object at every moment of the rolling operation. Thus, according to the conventional method, it has been impossible to construct an accurate control model because the parameter values are changed due to various factors, and even if a modern control theory which can improve the performance when the control model is accurate has been applied it has not been possible to fully exhibit this ability. However, by employing the above-described embodiments, it is possible to generate an accurate control model which can be applied to an object to be controlled that has strong nonlinear characteristics, and it is also possible to improve the control performance.

Thus, according to the present invention, it is possible to improve the precision level of the set up control (or the set point control) for deciding a set point to control the object of strong nonlinearity, with a satisfactory result of the control.

We claim:

1. A method for controlling an object by giving commands to actuators to control said object to perform desired operations, said method comprising the steps of:

obtaining, by learning, relationships between respective values of parameters of a model for said controlled object and input/output state values of said model, and storing the obtained relationships in memory means as results of the learning;

deciding parameter values of said model by referring to the obtained relationships resulting from the learning stored in said memory means based on input/output measured values of said controlled object; and obtaining commands based on said decided parameter values and giving said obtained commands to said actuators.

2. A control method according to claim 1, wherein said step of learning is carried out by using a neural network.

3. A control method according to claim 1, wherein said step of deciding said parameter values is carried out by using a neural network.

4. A control method according to claim 1, wherein said controlled object is a nonlinear control system.

5. A control method according to claim 4, wherein said controlled object is a rolling mill.

6. A controlled for controlling an object by giving commands to actuators to control said object to perform desired operations, said method comprising the steps of:

obtaining, by learning, relationships between respective values of parameters of a model for said controlled object and input/output state values of said model, and storing the obtained relationships in memory means as results of the learning;

deciding parameter values of said model by referring to the obtained relationships resulting from the learning stored in said memory means based on input/output measured values of said controlled object;

obtaining commands based on said decided parameter values and giving said obtained commands to said actuators, wherein said model for said controlled object is a setup model, said steps of giving said commands to said actuators includes the steps of:

deciding target values of input and output of said controlled object by a setup controlled based on said decided parameter values, and obtaining said command and giving said commands to said actuators; and making a feedback control so that output states obtained from said controlled object as results of said commands have no error from said target values of output.

7. A control method according to claim 6, wherein said step of making said feedback control includes the step of deciding feedback coefficients based on said decided parameter values.

8. A control method according to claim 7, wherein said step of deciding feedback coefficients includes the step of obtaining influence coefficients based on said decided parameter values and obtaining said feedback coefficients based on said influence coefficients.

9. A control method according to claim 1, wherein said step of deciding said parameter values includes the step of deciding parameter values based on long-term and short-term input/output measured values of said controlled object.

10. A control unit for controlling an object by giving commands to actuators to control said object to perform desired operations, comprising:
means for obtaining, by learning, relationships between respective values of parameters of a model for said controlled object;
means for storing results of the learning;
means for deciding parameter values of said model by referring to said learning results stored in said memory means based on input/output measured values of said controlled object; and
means for obtaining commands based on said decided parameter values and giving said obtained commands to said actuators.

11. A control unit according to claim 10, wherein said means for learning includes a neural network.

12. A control unit according to claim 10, wherein said means for deciding parameter values includes a neural network.

13. A control unit according to claim 10, wherein said controlled object is a nonlinear control system.

14. A control unit according to claim 13, wherein said controlled object is a rolling mill.

15. A control unit for controlling an object by giving commands to actuators to control said object to perform desired operations, comprising:
means for obtaining, by learning, relationships between respective values of parameters of a model for said control object;
means for storing results of the learning;
means for deciding parameter values of said model by referring to said learning results stored in said memory means based on input/output measured values of said controlled object;
means for obtaining commands based on said decided parameter values and giving said obtained commands to said actuators, wherein
said model for said controlled object is a setup model, and
said means for giving commands to said actuators includes:
means for deciding input/output target values of said controlled object by a setup control based on said decided parameter values, obtaining said commands and giving the obtained commands to said actuators; and
means for making a feedback control so that output states obtained from said controlled object as results of said commands have no error from said output target values.

16. A control unit according to claim 15, wherein said means for making a feedback control decides feedback coefficients based on said decided parameter values.

17. A control unit according to claim 16, wherein said means for deciding said feedback coefficients obtains influence coefficients based on said decided parameter values and obtains said feedback coefficients based on said influence coefficients.

18. A control unit according to claim 10, wherein said means for deciding said parameter values decides parameter values based on long-term and short-term input/output measured values of said controlled object.

19. A method for controlling an object by giving commands to actuators to control said object to perform desired operations, said method comprising the steps of:
obtaining, by learning, relationships between respective values of parameters of a model for said controlled object and input/output state values of said model, and storing the obtained relationships in memory means as results of the learning;
deciding parameter values of said model by referring to said learning results stored in said memory means based on input/output measured values of said controlled object; and
tuning said model based on said decided parameter values, obtaining commands based on said tuned model and giving said commands to said actuators.

20. A control unit for controlling an object for giving commands to actuators to control said object to perform desired operations, comprising:
means for obtaining, by learning, relationships between respective values of parameters of a model for said controlled object;
means for storing results of said learning;
means for deciding parameter values of said model by referring to said learning results stored in said memory means based on input/output measured values of said controlled object; and
means for tuning said model based on said decided parameter values, obtaining commands based on said tuned model and giving said obtained commands to said actuators.

* * * * *